United States Patent [19]

Pilarski et al.

[11] 4,065,070
[45] Dec. 27, 1977

[54] DUAL SPOOL RETRACTOR

[75] Inventors: Regis V. Pilarski, Utica; Gerald A. Yates, Milford, both of Mich.

[73] Assignee: The Firestone Tire & Rubber Company, Akron, Ohio

[21] Appl. No.: 668,070

[22] Filed: Mar. 18, 1976

[51] Int. Cl.$^2$ .................. A62B 35/02; B65H 75/48
[52] U.S. Cl. ............................................ 242/107.4 A
[58] Field of Search .............. 242/107.4 R–107.4 E; 280/744–747; 297/388

[56] References Cited

U.S. PATENT DOCUMENTS

| 2,825,581 | 3/1958 | Knight | 280/747 |
| 3,189,296 | 6/1965 | Wrighton et al. | 242/107.4 B |
| 3,220,668 | 11/1965 | Martin | 242/107.4 A |

Primary Examiner—Stanley N. Gilreath
Assistant Examiner—John M. Jillions
Attorney, Agent, or Firm—Miller, Morriss and Pappas

[57] ABSTRACT

A retractor for safety belt webbing as used in automobiles which includes a frame and a pair of retractor spools journalled in the frame and the spools biased to reel in loose webbing. The spools extend and retract harness webbing against the bias and both spools include ratchet faced rotating end flanges. Between the spools a pawl is located. The pawl is double edged for simultaneous engagement, on tilting, with the ratchet teeth of the ratchet flanges of both spools. The pawl is in a bar form supported in the frame and upon tilting locks the retractors against withdrawal of webbing spooled thereon. A sensor activates or tilts the pawl and may act remotely on the pawl as by a lever. The sensor may be inertial and omnidirectional and reacts to changes in acceieration rate of the frame and vehicle to which it may be attached.

4 Claims, 6 Drawing Figures

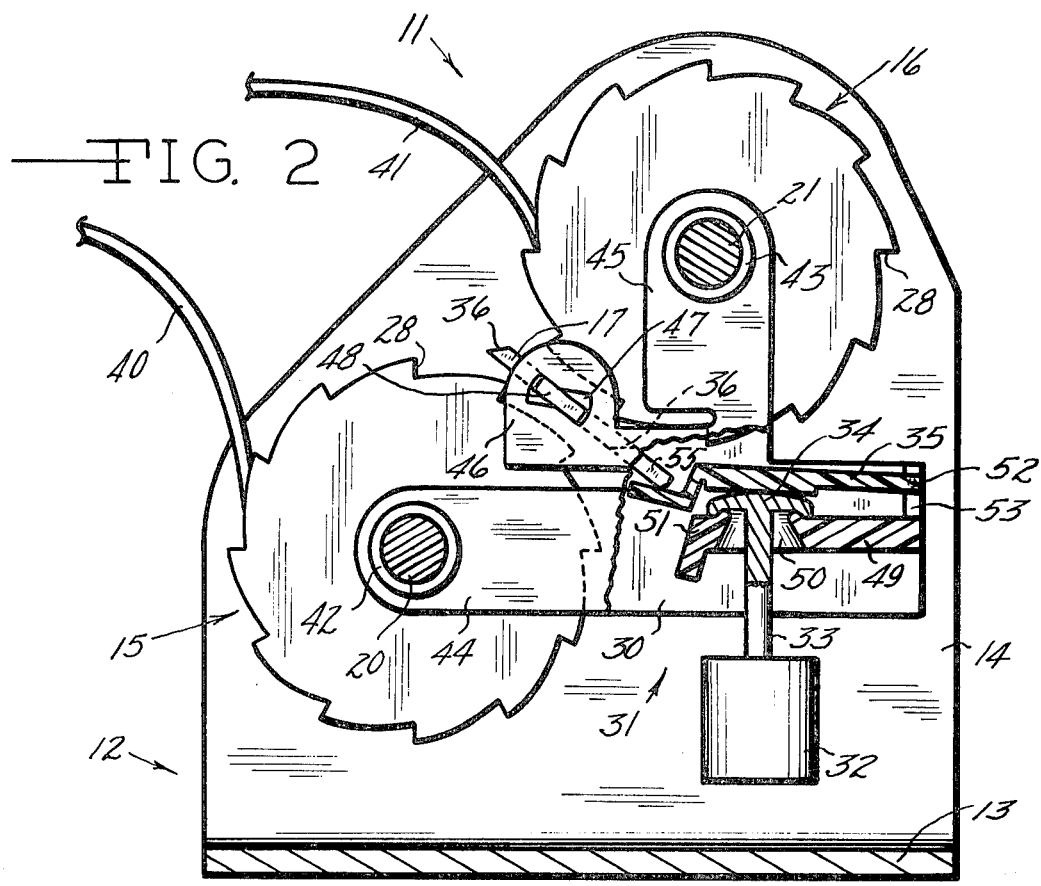
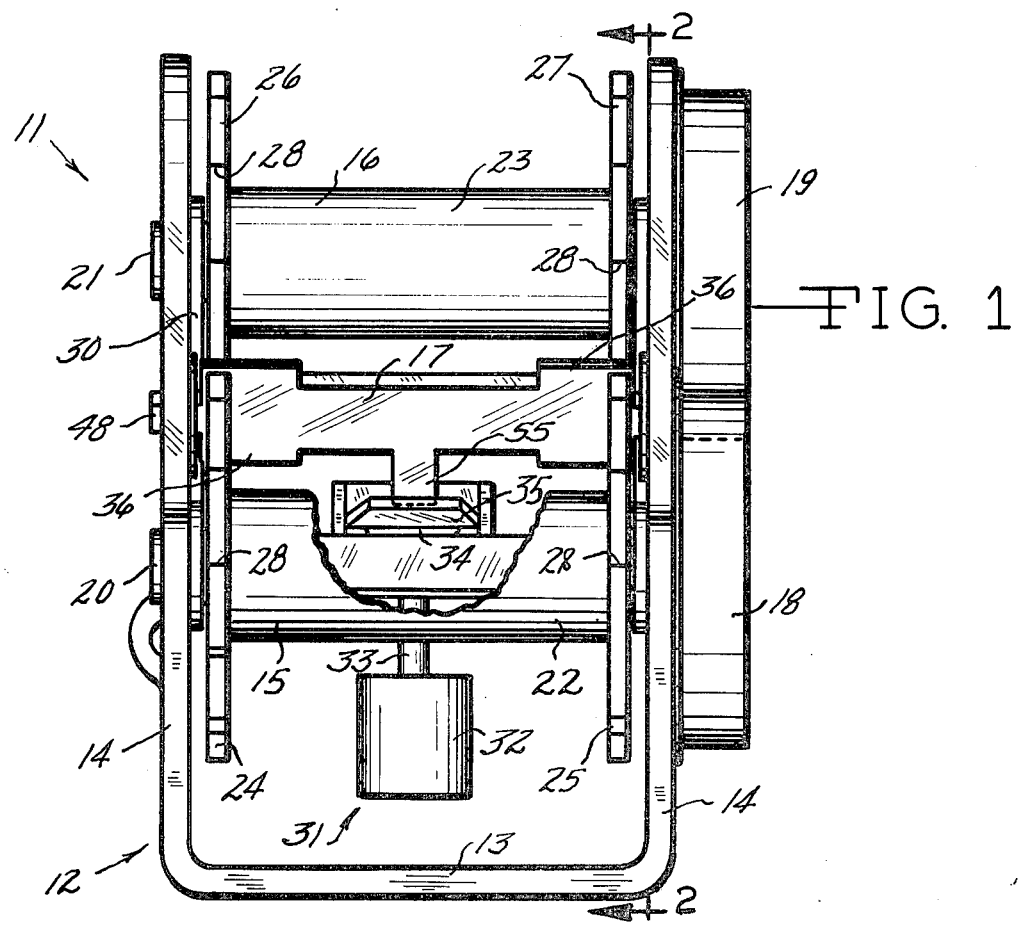

DUAL SPOOL RETRACTOR

The present invention is a seat belt retractor structure which is selectively lockable against withdrawal of webbing or cable when a selected emergency condition occurs such as sudden deceleration and in which two spools or reels are utilized in the same frame in independent or coordinated manner so as to accommodate variations in safety harness where formerly two separate retractors were required or desired. In the present invention the same lock means acting in response to emergency sensed condition acts simultaneously on both reels or spools in whatever state or withdrawal either or both of the retractors are in. Actually complex harness control is simplified by the present structure and with resultant economies in manufacture and with reliability of performance. Installation economy is realized because a single frame requires mounting to a vehicle structure and where added length of webbing pull is required, the two spools are available to contribute added effective length of webbing. The present structure accommodates continuous loop systems since both ends are capable of connection as to tongues, buckles or other harness and separate use may be made of each without impairment of performance of the extended unit. For example, one spool may be connected to a shoulder control harness and the other spool may be connected to a torso or lap harness and both would be locked simultaneously or if one is unfastened the fastened unit would be locked. Accordingly, the utility or rectractor is substantially extended by the teachings of the present invention.

The retractors here referred to are used primarily in automobile safety harness environments and serve to store the webbing of the harness when not in use and to lock the harness from removal when an emergency condition is presented and the harness is partially extended around the body of the driver or passenger in a vehicle.

Thus, the principal object is to provide a multi-spool retractor and particularly a dual spool retractor locking by a common pawl with increased total webbing capacity.

Another object is to provide a dual spool retractor structure in which the spools may independently function or function together as desired where the common pawl locks against withdrawal from both spools.

Still another object is to provide a retractor frame for vehicular mounting at a single point to serve a plurality of retractors and to allow a single pawl to lock plural retractor spools.

Other objects are to provide a plural spool retractor which locks the spools upon the sensing of a serious and sudden threat to safety and in which the sensed condition is a direct actuator of a spool locking action.

Other objects including reliability, ease of manufacture and installation will be appreciated by those skilled in the art as the description proceeds.

GENERAL DESCRIPTION

Vehicular safety belt retractors are relatively well known in the safety belt and harness field. They comprise a spool or reel which is spring biased to wind up loose webbing or cable and which allows the webbing to be extended from the spool against the spring bias for attaching the cable or webbing to harness hardware such as buckles, tongues or sewn connections and the like. These retractors include in many instances sensing means which lock the reel against withdrawal by reason of a selected condition or by reason of a sensed condition related to sudden withdrawal of webbing or to sudden movement or change of acceleration of movement of the vehicle or frame. Collaterally, there are retractors which respond to an electrically sensed impulse in which the locking occurs by reason of the movement of a solenoid, magnet, or the like. The sensor in the latter type of devices comprise a switch or relay such as a ball or mercury making or breaking selected contact. Micro switches having mechanical actuation have also been used. The physical agent of locking the reels or spools against withdrawal is usually a pawl or blocking bar which interferes with the rotation of the drum or spool by engaging a ratchet which runs with the spool or drum as a portion thereof. For the most part heretofore, each spool has required a pawl and each spool included a separate mounting frame.

In general, the present invention proposes a multi-spool retractor in which a single pawl acts simultaneously to block or lock plural spools from withdrawal rotation. In particular, a dual spool retractor is described. The multi-spool structure is supported in a single or common frame. The frame provides mounting means for the retractor spring motors operably attached to each of the spools and biased to wind loose webbing on the spools. The spools include ratchet means both capable of locking when the spools are rotated by webbing withdrawal and both disabled against locking during retraction. The spools are mounted in the frame and are journalled for rotation on parallel spaced-apart axes. Upon withdrawal of webbing both spools move individually in the same direction as do the ratchets. Between the spools is a single multi-edged pawl, the edges or dogs thereof being registrably located to engage both ratchets simultaneously when moved. The pawl is mounted for movement in the frame and normally biased as by gravity or spring means out of engagement with either or both of the ratchets. By overcoming the bias (as by gravity or light spring) the pawl is rotated to simultaneously engage both ratchets and hence block or lock both spools against webbing withdrawal. A sensor structure is used to upset the normal bias of the pawl. The sensor structure directly moves the pawl in response to a selected or environmental response. Inertial forces, for example, overcome the bias on the pawl and close the pawl lockably against the ratchets and prevent withdrawing of webbing from either of the spools until the restoration of normalcy and the spools can thereupon respond to the rewind bias of the winding spring. Once engaged, the opposed locking forces of the ratchets seat the dogs firmly in the ratchet teeth and the thrust resultant is absorbed in the frame equally where the bar pawl is employed. With dual spools a simple flat pawl plate bar is useable in locking relationship to ratchet flanges on the spools and the spools act as web retaining end barriers and as toothed means radially provided on the flange perimeters. Then, tilted by whatever means in its frame support, the pawl simultaneously blocks webbing withdrawal from both of the spools and the closure of pawl on ratchet is a driven function arresting the tendency of webbing to flow from the drums or spools. When tension on the webbing is relaxed, the spools retract the webbing and the ratchet teeth kick the pawl out of lock engagement.

In operation, a single frame structure with dual spools accommodates double the previously handled webbing where desired and substantial construction economies are realized with the simplicity of using a single pawl for multiple locking of plural spools. In addition the retractor of the present invention is useful in a wide variety of sensing arrangements and harness arrangements where independent retraction is desirable.

IN THE DRAWINGS

FIG. 1 is a front elevation view of a retractor in accord with the present invention and partially cut away to reveal the pawl element in operable engagement with the sensor.

FIG. 2 is a section view taken on the line 2—2 of FIG. 1 and partially cut away to best reveal the omnidirectional sensor suspended from the transverse saddle and operably engaged with the pawl element between the drums or spool.

SPECIFIC DESCRIPTION

Figure 3:
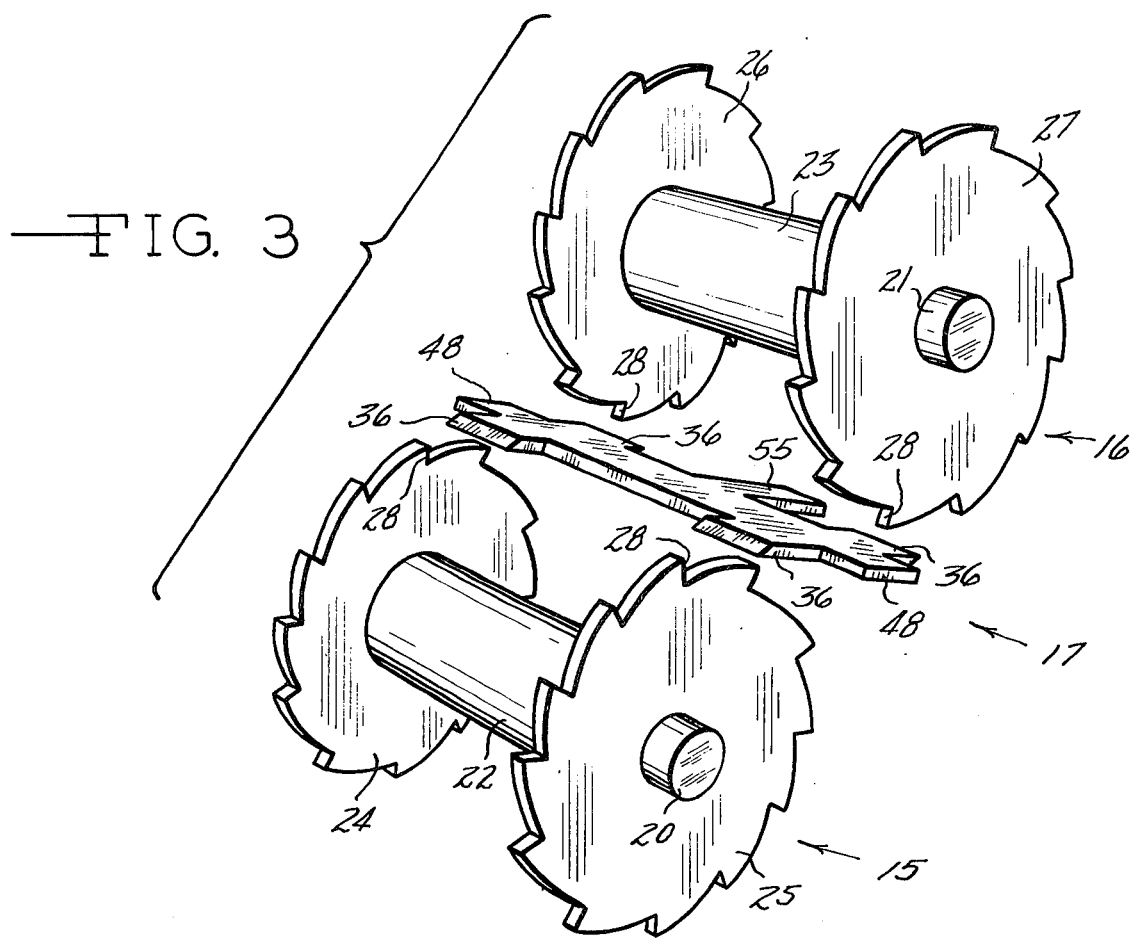
FIG. 3 is an exploded perspective view of a pair of spaced-apart parallel axised webbing drums with ratchet flanges in registry with the dogs of the single locking pawl between the spools or drums.

Referring to the drawings and with first particularity to the FIG. 1 thereof, the present invention is seen in a preferred embodiment as assembled and used by bolting, welding or otherwise securing to vehicle structural members.

The multi-spool retractor shown is a dual spool retractor 11 compactly assembled in the general channel shaped frame 12 having a web portion or floor 13 and spaced-apart upstanding and integral flanges or sides 14. A plurality, shown as a pair of spools, reels or drums 15 and 16 are journalled in the frame 12 and are supported by the sides 14 of the frame 12. A pawl element 17 in the form of a pawl bar is transversely across the frame 12 between and supported pivotally by the arms 14. To each of the drums 15 and 16 a retractor spring motor is drivably secured in a well known manner by attaching one end of a spirally wound spring to the shaft of each drum and by attaching the other end of the spring to the frame 12 within the motor covers 18 and 19, respectively. These spring motors are biased so as to wind webbing on the spools or drums 15 and 16, respectively, while allowing the withdrawal of webbing or cable therefrom by overcoming the spring bias. The retractor motors are not shown but the retractor motors are located within the covers 18 and 19 and constantly urge retraction of webbing by the spools or drums 15 and 16. It will also be appreciated that the retraction bias is independently applied to each spool 15 and 16. Each spool is provided with a shaft 20 and 21, respectively, by cylindrical winding bodies 22 and 23, respectively. On each of the drums 15 and 16 there are a pair of ratchet wheels or flanges 24 and 25 and 26 and 27, respectively. These ratchet wheels or flanges 24, 25, 26 and 27 are attached to the shafts 20 and 21, respectively, and to the winding bodies 22 and 23 so that as the drum or spool structures 15 and 16 move, the ratchet wheels attached thereto must also move. The ratchet teeth 28 on the drums 15 and 16 are in spaced-apart register as shown and the flanges 24 and 26 are coplanar, and the flanges 25 and 27 are coplanar (FIG. 1). A resin saddle 30 is nested between the upstanding legs 14 of the frame 12 and provides journal support, as will be seen, for the shafts 20 and 21. The saddle 30 assists in support of the pawl 17 and provides suspension support for the sensor 31 shown here as an omnidirection headed pendulum structure with depending mass 32, connecting rigid arm 33 and head 34, which head 34 acts on the pawl actuator lever 35 to tilt the pawl 17 into lock engagement with the teeth 28 of the ratchet flanges 24, 25, 26 and 27. In actuality the dogs 36 on both sides of the pawl bar 17 achieve engagement with the teeth 28 upon the tilting of the pawl 17. Normally the pawl 17 is not engaged against the ratchet flanges 24, 25, 26 and 27 but upon a condition of inertial imbalance being sensed by the sensor 31, the pawl 17 is tilted and the pawl is thus driven into lock position preventing further withdrawal of webbing or cable from the drums or spools 15 and 16. In FIG. 2 the pawl 17 is seen in its normal position acted upon by gravity in the frame 12. Retraction, however, may always occur provided the retracting strengths in retractor motors in covers 18 and 19 are sufficient to pick up slack or loose webbing or cable.

In the FIG. 2 the structure of FIG. 1 is given further definition and the webbing 40 and 41 (which may in some instances be cable) is shown fully wound on the drums 15 and 16 and withdrawal of webbing 40 and 41 therefrom causes a clockwise rotation as shown in both drums or spools 15 and 16, respectively. The ratchet teeth 28 are provided or ramped so as to prevent withdrawal of webbing 40 and 41 when engaged against the dogs 36 of the pawl 17 and in prevention of rotation on the drums 15 and 16. As shown, both drums 15 and 16 rotate in a clockwise direction as the webbing 40 and 41 is withdrawn. The pawl 17, upon tilting, arrests further withdrawal.

The sensor 31 and the saddle 30 are best understood in the FIG. 2. The saddle 30 includes an integral pair of bushings 42 in support of the shaft 20 and bushings 43 in support of the shaft 20. These extend from the saddle legs 44 and 45 and protrude, as will be seen, into shaft support openings in the frame 12 as shown. A third arm 46, which is a part of the saddle 30, supports the pawl 17 and the butterfly opening 47 provides a control rotating axis for the pawl 17 at the extension 48 thereon. As will be seen, the bushings 42 and 43 snap into corresponding openings in the frame 12 and establish dimensional control. The saddle 30 is preferably made from injection molded resin such as polypropylene or the like to provide the entity as shown with high precision and at repetitive accuracy. Transverse of the sets of arms 44, 45 and 46, is a bridge portion 49 which supports the sensor 31 and the pawl lever 35. The opening 50, having an upper annular raised portion 51, is defined through the bridge portion 49 and this allows the headed rigid pendulum structure 34, 33, 32 to depend from the saddle bridge 49. Upon the weight or mass 32 changing position (inertial displacement), then the cap 34 rises on the annular ridge 51 and causes the pawl 17 to tilt so that the dogs 36 lock both drums 15 and 16. The lever 35 is hinged on the hinge pin 52 extending between the pedestals 53 which are also integrally formed in the saddle 30. The resin saddle 30 is made from resin possessing good dimensional stability, good molding properties, and good lubricity characteristics allow it to be used for journalling of the shafts 20 and 21. The resin is deformable to accommodate assembly and other resins having similar properties may be used. The lever 35 engages the pawl 17 at the tang 55. The tang 55 gravitationally biases the pawl 17 into a disengaged or unlocked position as illustrated in the FIG. 2.

Figure 4:
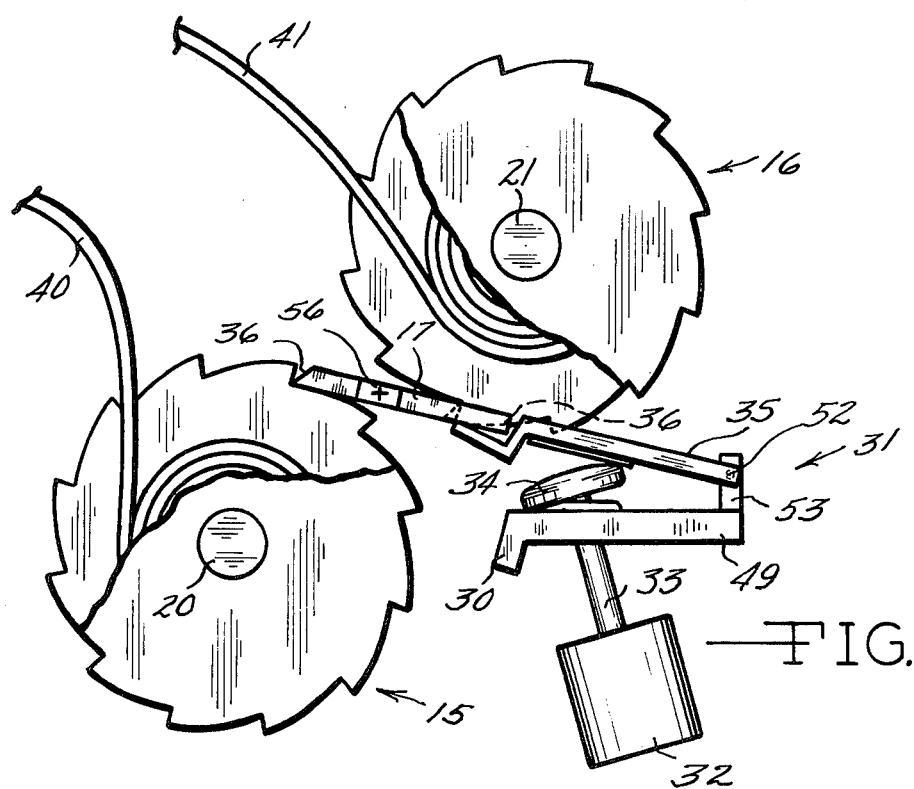
FIG. 4 is a fragmental end elevation view of the spools and pawl seen in FIG. 3 but with a sensor structure added and tilting the pawl into locking relation in prevention of further withdrawal of webbing from either drum and with the locking thrust in both drums counter applied to the pawl.

By reference to the FIG. 3, the role of the pawl 17 intermediate the drums 15 and 16 can best be appreciated since the plural sets of dogs 36 are in registry or interference relation with the teeth 28 on the ratchet flanges 24, 25, 26 and 27. The tang 55 integral with the pawl 17 provides a normal gravity bias out of contact with the ratchet teeth 28. However, in FIG. 4, using an omnidirectional inertial sensor 31, the pawl 17 is seen tilted on its axis 56 when the mass 32 and attached stem 33 is displaced from its normal vertical position as by sudden change in acceleration of the frame 12 or vehicle (not shown) to which the frame 12 is secured.

Figure 5:
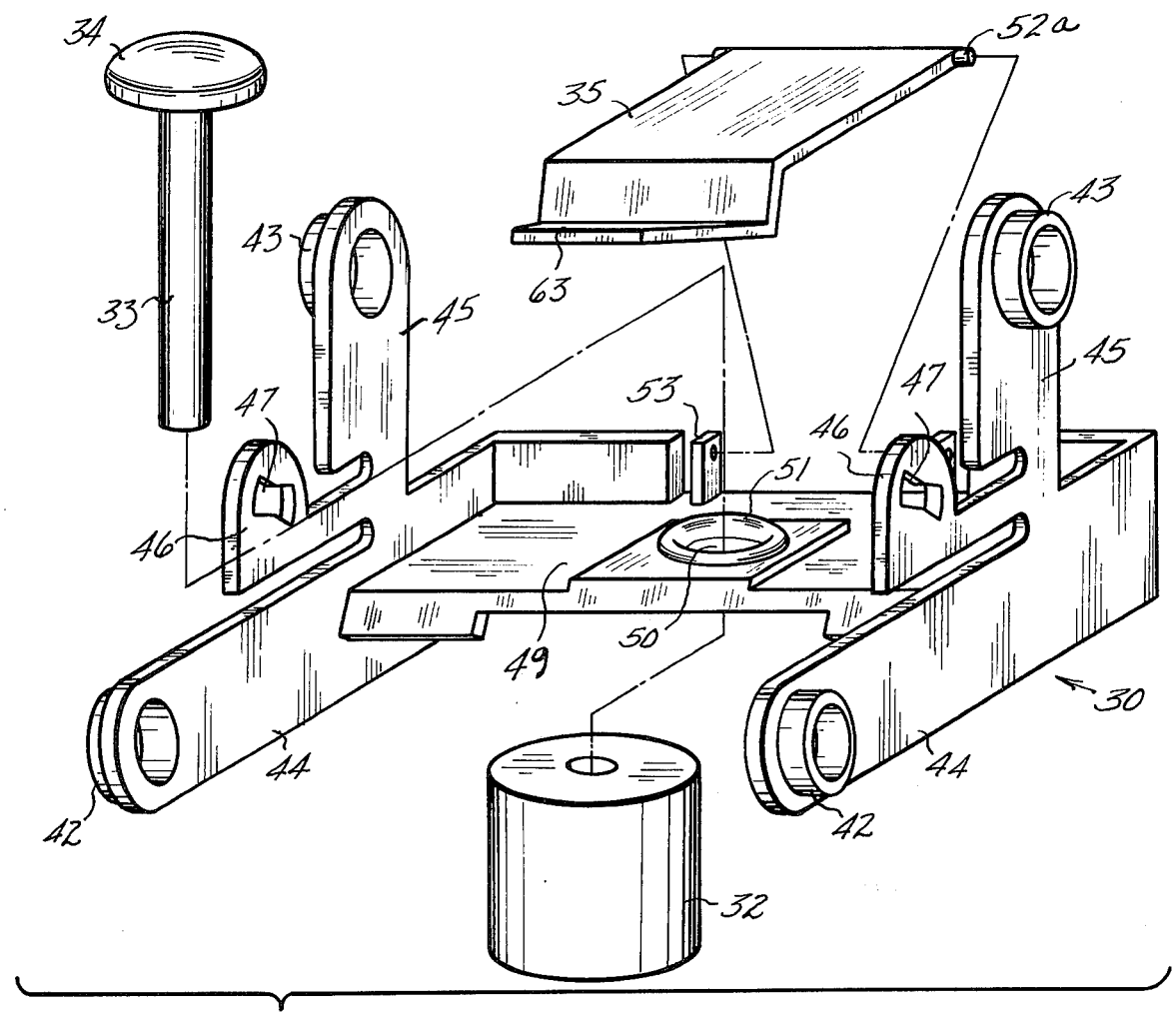
FIG. 5 is a partially exloded perspective view of a structure in accord with the present invention and showing a resin saddle element with integral bushings for journal support of the drums in the frame and in support of the pawl and omnidirectional inertial sensor as well as showing the simplicity of the sensor and the pawl actuating lever.
Figure 6:
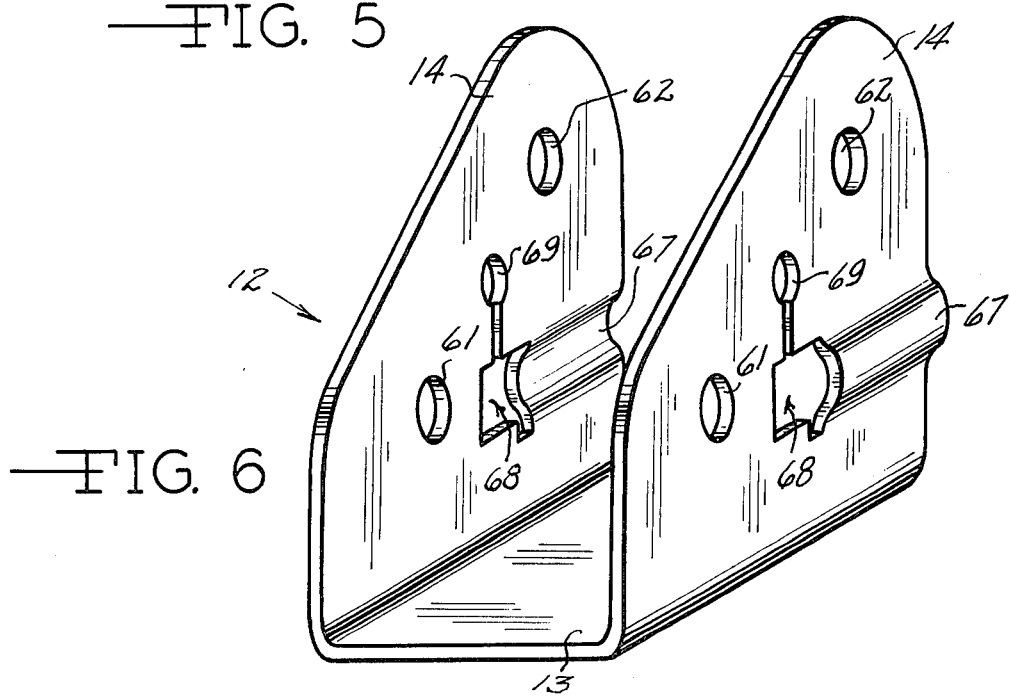
FIG. 6 is a full perspective view of the retractor frame into which is loaded the saddle structure and elements of FIGS. 3 and 5 and the spring retractor motors in FIG. 1.

In FIG. 5 the saddle 30 is best appreciated and the assembly relationship is understood. In width the saddle 30 equals the distance in the channel space between the sides 14 of the frame except for the protruding bushings 42 and 43 which extend into the openings 61 and 62, respectively, in the frame side 14 of the frame 12 (FIG. 6). The actuating lever 35 with its pivot pins 52a is snapped into position in the openings provided in the pedestals 53 which is a part of the bridge 49 of the saddle 30. This establishes the pivot 52 as previously described. The lever 35 extends forwardly as shown and the ledge 63 protrudes or extends providing a normal floor contact with the tang 55 of the pawl 17. In normal position the lever 35 rests on the head 34 of the pendulum structure shown as the sensor 31. When the mass 32 is attached to the stem 33 passed through the opening 50 in the platform or bridge 49, the head 34 rests on the annular raised portion 51 surrounding the opening 50. When change in acceleration is sensed, the head 34 tilts on the raised annulus 51 and correspondingly moves the lever 35 and pawl tang 55 and accordingly the pawl 17. Then the dogs 36 lock against the teeth 28 of both drums and no further withdrawal of webbing 40 or 41 can occur.

While not shown, it will be appreciated that the webbing or cable extends to connect with well known harness hardware or software as buckles or harness components and that when locked by the retractor 11 against further withdrawal, the safety harness, providing lap, shoulder, torso or other restraint, is secure. Collaterally the saddle 30 may be variously structured so as to assure normal vertical depending relationships in the pendulum structure when the frame 12 is installed in a vehicle. Likewise the frame 12 may be modified to suit the installation and lead-out or guide provisions for the webbing 40 and 41 may be integrated with or attached to the frame 12 or vehicle environment so that the webbing flows as desired.

The FIG. 6 shows the simplest form of the channel frame 12. The base or floor 13 is provided with openings or fastening flanges or the floor may be welded to structure portions of the vehicle the openings 62 and 61 receive the saddle 30 and the shafts 20 and 21 of the drums 15 and 16. The reliefs at 67 and connecting openings at 68 in the walls 14 provide assembly accommodations and the opening 69 provides a thrust buttress for the pawl 17 at the extensions 48. Accordingly, the saddle 30 is deformed for assembly with the sensor 31 and pawl 17 in place and the pawl extensions 48 travel down the relief channels 67 into the opening 68 whereupon the saddle is tilted and the pawl ends 48 travel upwardly to final snap-in of the bushings 42 and 43 whereupon the pawl 17 is properly oriented in the frame 12 and the retractor saddle 30 is suitably assembled awaiting shafts 20 and 21 through drums 15 and 16 and securing of the retractor spring motor assemblies to the outside of the frame 12 as shown in FIG. 1.

While illustrated herein as a frame 12 in which the floor 13 is intended for horizontal installation, the frame may be modified for variant mounting from horizontal and in such instances the relative of arrangement of components referenced to horizontal or vertical is maintained. Thus, the shape of the frame 12 and the saddle mounting may be varied as desired to accommodate a particular arrangement or location in a vehicle such as an automobile, aircraft or boat.

As thus described, multi-spool retractors using a single pawl for locking the spools have proved to function satisfactorily in testing and have broadened the utility of specific harness structures with attendant expressed economies of manufacture and assembly.

Having thus disclosed our invention and a specific embodiment thereof, those skilled in the art will readily appreciate changes, modifications and improvements within the skill of the art are intended to be included in the present invention limited only by the scope of our hereinafter appended claims.

We claim:

1. In a multi-spool structure for safety belts and the like, the combination comprising:
    a mounting frame;
    a pair of spaced-apart spools journalled on said frame, said spools having webbing retractable thereon and extendable therefrom and the axes of said spools being in spaced-apart parallel relation;
    a retractor spring on each of said spools and connected to said frame urging retraction of said webbing onto said spools;
    ratchet flanges on said spools confining said webbing therebetween and said ratchet flanges on one of said spools being in planes parallel with the corresponding ratchet flanges of the other of said spools;
    a pawl tiltable in said frame between said spools on an axis offset and parallel to the axes of said spools and intermediate said spools, said pawl having plural oppositely facing dogs and said dogs in blocking registry with said ratchet flanges on both of said spools and upon tilting said dogs in blocking engagement with said ratchet flanges of both of said spools; and
    movable means supported by said frame and operably positioned to selectively displace said pawl.

2. The combination as set out in claim 1 wherein said movable means comprises a condition sensor which is movable upon a condition as selected.

3. The combination as set out in claim 2 wherein said condition sensor is an inertial structure being selectively displaceable and upon displacement tilting said pawl.

4. The combination of claim 3 which includes a lever connected to said pawl and acted upon by said condition sensor and said lever thereupon tiltably displacing said pawl.

* * * * *

UNITED STATES PATENT OFFICE
CERTIFICATE OF CORRECTION

Patent No. 4,065,070                Dated   1977 December 27

Inventor(s)  Regis V. Pilarski and Gerald A. Yates

It is certified that error appears in the above-identified patent and that said Letters Patent are hereby corrected as shown below:

Column 1, line 13, change "or" (second occurrence) to read --- of ---

Column 1, line 31, change "rectractor" to read --- retractor ---

Column 6, line 62, Claim 3, after "inertial" insert --- sensing ---

Signed and Sealed this

Ninth Day of May 1978

[SEAL]

Attest:

RUTH C. MASON
Attesting Officer

LUTRELLE F. PARKER
Acting Commissioner of Patents and Trademarks